(12) United States Patent
Akasaka et al.

(10) Patent No.: US 6,761,389 B2
(45) Date of Patent: Jul. 13, 2004

(54) AUTOMOBILE HEEL STOPPER SHOCK-ABSORBING STRUCTURE

(75) Inventors: Kosuke Akasaka, Wako (JP); Shinji Kumagai, Wako (JP); Keiichi Honda, Wako (JP); Yuji Kikuchi, Tochigi (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/411,683

(22) Filed: Apr. 11, 2003

(65) Prior Publication Data

US 2003/0222478 A1 Dec. 4, 2003

(30) Foreign Application Priority Data

Apr. 17, 2002 (JP) ........................................ 2002-115140

(51) Int. Cl.[7] .............................................. B60N 3/06
(52) U.S. Cl. .................................................... 296/75
(58) Field of Search ........................ 296/187.05, 187.08, 296/193.07, 75, 97.23

(56) References Cited

U.S. PATENT DOCUMENTS 6,224,133 B1 * 5/2001 Abramoski et al. ........... 296/75
6,283,529 B2 * 9/2001 Kitagawa ...................... 296/75
6,634,694 B2 * 10/2003 Matsushita .................... 296/75

FOREIGN PATENT DOCUMENTS

JP           2001-219872           8/2001

* cited by examiner

Primary Examiner—Jason Morrow
(74) Attorney, Agent, or Firm—Merchant & Gould, P.C.

(57) ABSTRACT

An automobile heel stopper shock-absorbing structure is formed from a receiving plate that on the outside has a heel receiving surface and on the inside faces a dash panel with a space therebetween, a front support plate connected integrally to a front end part of the receiving plate and having its extremity joined to the dash panel, and a rear support plate connected integrally to a rear end part of the receiving plate and having its extremity joined to at least one of the dash panel and a floor panel. The rear support plate is made weaker than the receiving plate and the front support plate so that the rear support plate will buckle when a pushing-in load acting on the receiving plate is equal to or greater than a predetermined value. The values of flexural rigidity of the front support plate and the receiving plate are set so that the front support plate falls forward so as to make the receiving plate sink forward when the pushing-in load acting on the receiving plate is equal to or greater than a predetermined value.

5 Claims, 4 Drawing Sheets

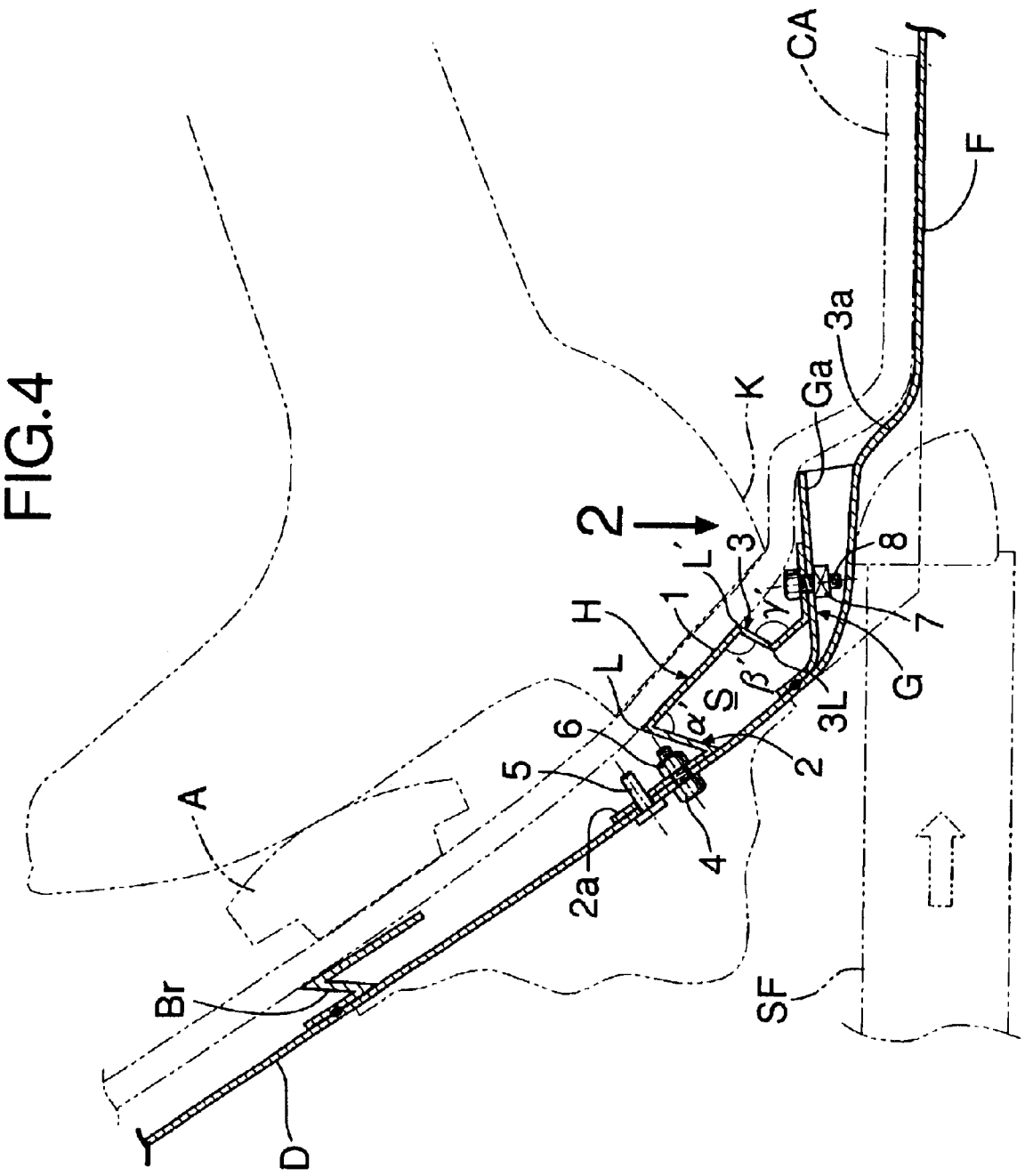

AUTOMOBILE HEEL STOPPER SHOCK-ABSORBING STRUCTURE

BACKGROUND OF THE INVENTION

1. Field of the Invention

The present invention relates to a shock-absorbing structure for a heel stopper in an automobile in which a heel stopper member is disposed in a lower part of a dash panel of a vehicle body so as to project rearward from the panel surface, the heel stopper member being capable of engaging with a heel of an occupant in a front seat.

2. Description of the Related Art

When an automobile body receives a large shock from the front due to a head-on collision, etc., an upper part of a dash panel is slightly deformed rearward, and a foot of an occupant in a front seat tends to be pushed forward strongly due to inertia. This causes the heel part of the foot to be pushed forward and the toe part to be pushed rearward, leading to a possibility that a large moment around an axis in the vehicle width direction acts on the ankle.

In a conventionally known arrangement (see, for example, Japanese Patent Application Laid-open No. 2001-219872), a heel stopper member is disposed in a lower part of a dash panel so as to project rearward from the panel surface, and while a front part of the member is secured to the dash panel, a rear part thereof can slide on a floor panel. When an upper part of the dash panel is deformed rearward due to the shock of a collision, the heel stopper member is made to slide rearward on the floor panel in association with the deformation, thus restricting forward movement of the heel part to reduce the moment acting on the ankle.

However, in the above conventional arrangement, since the rear part of the heel stopper member is not fastened to the floor panel, the rear part of the heel stopper member may be displaced during assembly, use or a collision. As a result, the heel may not appropriately abut against a heel receiving surface of the heel stopper member, or the heel stopper member may tilt while it is sliding rearward, resulting in the ankle being twisted.

Furthermore, the conventional heel stopper member itself does not have sufficient shock-absorbing ability, and a large shock applied to the heel stopper member may be entirely transferred to the ankle when the dash panel deforms during the collision or if a vehicle body component (for example, a subframe) in front of the dash panel projects toward the heel stopper member.

SUMMARY OF THE INVENTION

The present invention has been proposed in view of the above-mentioned circumstances, and it is an object of the present invention to provide an automobile heel stopper shock-absorbing structure that has a simple structure and can solve the above-mentioned problems of the conventional arrangement.

In order to accomplish the above object, a first aspect of the present invention provides an automobile heel stopper shock-absorbing structure in which a heel stopper member is disposed in a lower part of a dash panel of a vehicle body so as to project rearward from the panel surface and be capable of engaging with a heel of an occupant in a front seat, wherein the heel stopper member is formed from a receiving plate that on the outside has a heel receiving surface and on the inside faces the dash panel with a space therebetween, a front support plate connected integrally to a front end part of the receiving plate and having its extremity joined to the dash panel, and a rear support plate connected integrally to a rear end part of the receiving plate and having its extremity joined to at least one of the dash panel and a floor panel, and wherein the rear support plate is made weaker than the receiving plate and the front support plate so that the rear support plate will buckle when a pushing-in load acting on the receiving plate is equal to or greater than a predetermined value, and values of flexural rigidity of the front support plate and the receiving plate are set so that the front support plate falls forward so as to make the receiving plate sink forward when the pushing-in load acting on the receiving plate is equal to or greater than a predetermined value, whereby when a compression load acting between the heel and the receiving plate becomes equal to or greater than a predetermined value due to a collision of an automobile, a shock acting on the heel is primarily absorbed by buckling of the rear support plate, and furthermore is secondarily absorbed by falling-forward of the front support plate.

In accordance with this arrangement, even when the upper part of the dash panel is slightly deformed rearward due to a large shock to the vehicle body from the front when the automobile is involved in a collision, and a foot of the occupant in the front seat is pushed forward strongly due to inertia, since the heel can engage with the heel receiving surface of the heel stopper member, excessive forward movement of the heel can be suppressed. The shock that the heel receives at this time can be primarily absorbed by buckling of the rear support plate of the heel stopper member and, furthermore, secondarily absorbed by the front support plate falling forward and deforming so as to make the heel receiving surface of the heel stopper member sink forward. In this case, since the extremity of the rear support plate of the heel stopper member is joined to at least one of the dash panel and the floor panel and the extremity of the front support plate is joined to the dash panel, there is no possibility of the heel stopper member being significantly displaced relative to the dash panel and the floor panel. Moreover, the angle through which the receiving plate tilts is maintained in a predetermined appropriate angular range by the buckling of the rear support plate and the falling forward of the front support plate, so that the ankle is not forcibly twisted. In this way, the heel can be appropriately engaged with and supported on the heel receiving surface of the receiving plate, thus effectively suppressing the excessive forward movement of the heel. Moreover, when the heel is engaged, the heel stopper member itself deforms (the buckling of the rear support plate and the falling forward of the front support plate), thereby effectively absorbing and alleviating the shock on the heel. As described above, since the shock and the moment around the axis in the vehicle width direction acting on the ankle can be lessened while avoiding forcible twisting of the ankle, the burden on the ankle can be greatly lightened, resulting in a very effective prevention of damage thereto.

Furthermore, in accordance with a second aspect of the present invention, in addition to the first aspect, there is proposed an automobile heel stopper shock-absorbing structure wherein the extremity of the front support plate is secured to the dash panel at two or more positions. In accordance with this arrangement, even when the positions where the front and rear support plates are mounted are offset relative to each other in the lateral direction, or the directions in which forces acting on the two support plates are not uniform, the rigid front support plate and the rigid receiving plate portion of the heel stopper member can be effectively prevented from swinging around the longitudinal axis and tilting laterally, thereby preventing the ankle from being twisted due to the tilting of the receiving plate.

Moreover, in accordance with a third aspect of the present invention, in addition to the first or second aspect, there is proposed an automobile heel stopper shock-absorbing structure wherein a gusset is secured to at least one of the dash panel and the floor panel so as to correspond to a rear end part of a subframe that supports an engine on the vehicle body on the front side of the dash panel, and the extremity of the rear support plate is fixed to a protruding part of the gusset, the protruding part being separate from an upper surface of the floor panel. In accordance with this arrangement, since the rear support plate of the heel stopper member is supported on the vehicle body via the gusset, that is, in a state in which the rear support plate is raised from the upper surface of a front end part of the floor panel, even when the subframe moves forcefully rearward due to the shock of a collision and breaks into the front end part of the floor panel in the automobile in which the subframe is present on the front side of the heel stopper member, it is possible to avoid as much as possible the rear end part of the subframe directly hitting the heel stopper member, thereby enabling the heel stopper member to effectively exhibit desired shock-absorbing and heel supporting functions.

Furthermore, in accordance with a fourth aspect of the present invention, in addition to any one of the first to third aspects, there is proposed an automobile heel stopper shock-absorbing structure wherein the front support plate is connected to the receiving plate at a predetermined angle so as to form therebetween a ridgeline extending in the lateral direction of the vehicle body, downward flanges are formed integrally on at least one of left and right edges of each of the front support plate and the receiving plate, and a notch is formed in the heel stopper member so as to separate the downward flange of the front support plate from the downward flange of the receiving plate and cut into at least one end of the ridgeline. In accordance with this arrangement, while imparting a required rigidity to each of the receiving plate and the front support plate of the heel stopper member by specially providing the downward flanges, it becomes possible to cause folding deformation on the ridgeline between the receiving plate and the front support plate (that is, the falling forward deformation of the front support plate) without difficulty by specially providing the notch.

Moreover, in accordance with a fifth aspect of the present invention, in addition to any one of the first to fourth aspects, there is proposed an automobile heel stopper shock-absorbing structure wherein at least one fold line is formed in a middle section of the rear support plate so as to easily cause the buckling of the rear support plate. In accordance with this arrangement, even when the rear support plate is formed from a plate material, the buckling can be caused without difficulty.

The above-mentioned object, other objects, characteristics, and advantages of the present invention will become apparent from an explanation of a preferred embodiment that will be described in detail below by reference to the attached drawings.

BRIEF DESCRIPTION OF THE DRAWINGS

FIG. 4 is a simplified view corresponding to FIG. 1 showing a state in which the automobile is involved in a collision.

DESCRIPTION OF THE PREFERRED EMBODIMENT

Figure 1:
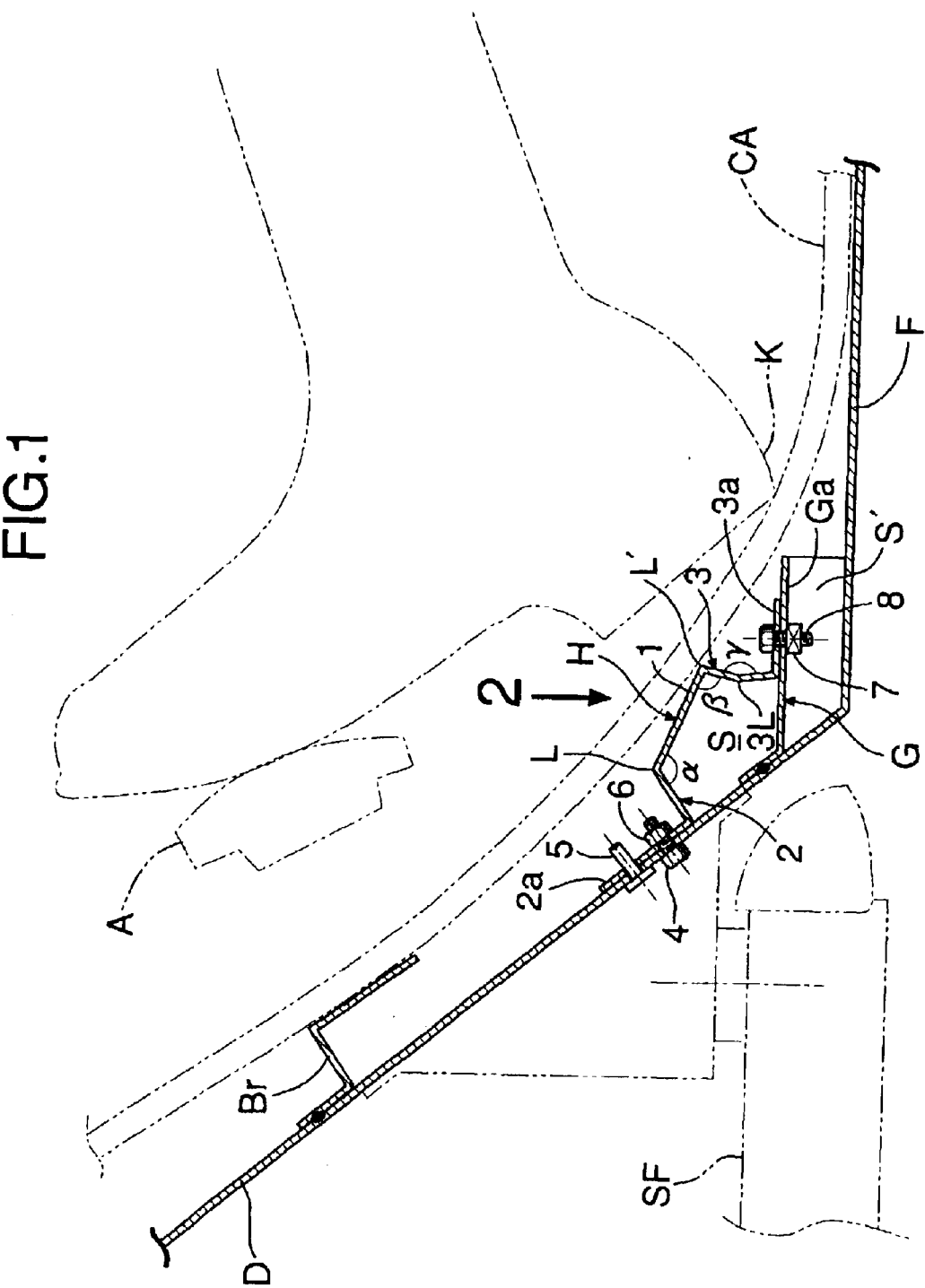
FIG. 1 is a longitudinal cross section of an automobile front seat foot area showing one embodiment of the present invention.

Referring to FIG. 1, a dash panel D of a vehicle body defining a passenger compartment and an engine compartment has its lower part inclined downward and rearward and its lower end connected integrally to a floor panel F. A heel stopper member H is disposed in a lower end part of the dash panel D at a position corresponding to a right heel K of an occupant in a front seat, the occupant pressing an accelerator pedal A within the passenger compartment, so that the heel stopper member H projects rearward relative to the panel surface of the dash panel D. This heel stopper member H can engage with the heel K, which moves forward due to inertia when the automobile is involved in a collision, thereby suppressing excessive forward movement of the heel K.

A support bracket Br projecting toward the passenger compartment is projectingly provided integrally with the dash panel D at a position above the heel stopper member H. A front end extension of a floor carpet CA laid on the floor panel F covers the dash panel D while sequentially extending above the heel stopper member H and the support bracket Br.

Disposed within the engine compartment on the front side of the dash panel D are a pair of left and right rigid subframes SF extending in the longitudinal direction in order to support an engine (not illustrated) on the vehicle body. In the illustrated embodiment, a rear end part of one of the subframes SF is at a position corresponding to the heel stopper member H. In order to avoid a direct shock on the heel stopper member H by the subframe SF moving rearward during a collision, which will be described later, a rigid gusset G corresponding to the subframe SF is secured so as to bridge the dash panel D and the floor panel F. This gusset G has an integral protruding part Ga having an angled section and extending in the longitudinal direction while covering a front end part of the floor panel F with a space S' therebetween. A rear support plate 3, which will be described later, of the heel stopper member H is fixed to the top of the protruding part Ga.

Figure 2:
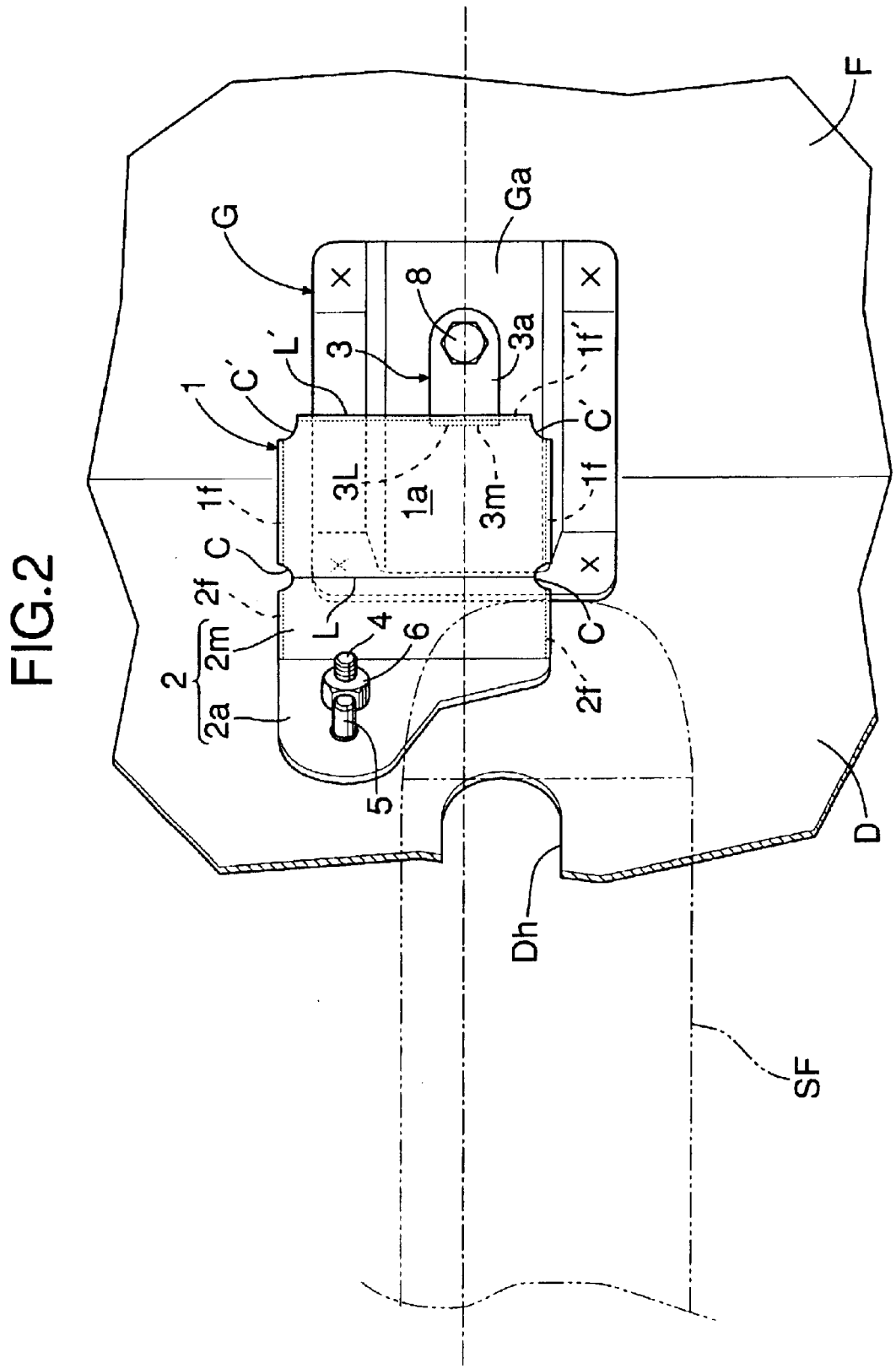
FIG. 2 is a magnified plan view from arrow 2 in FIG. 1.
Figure 3:
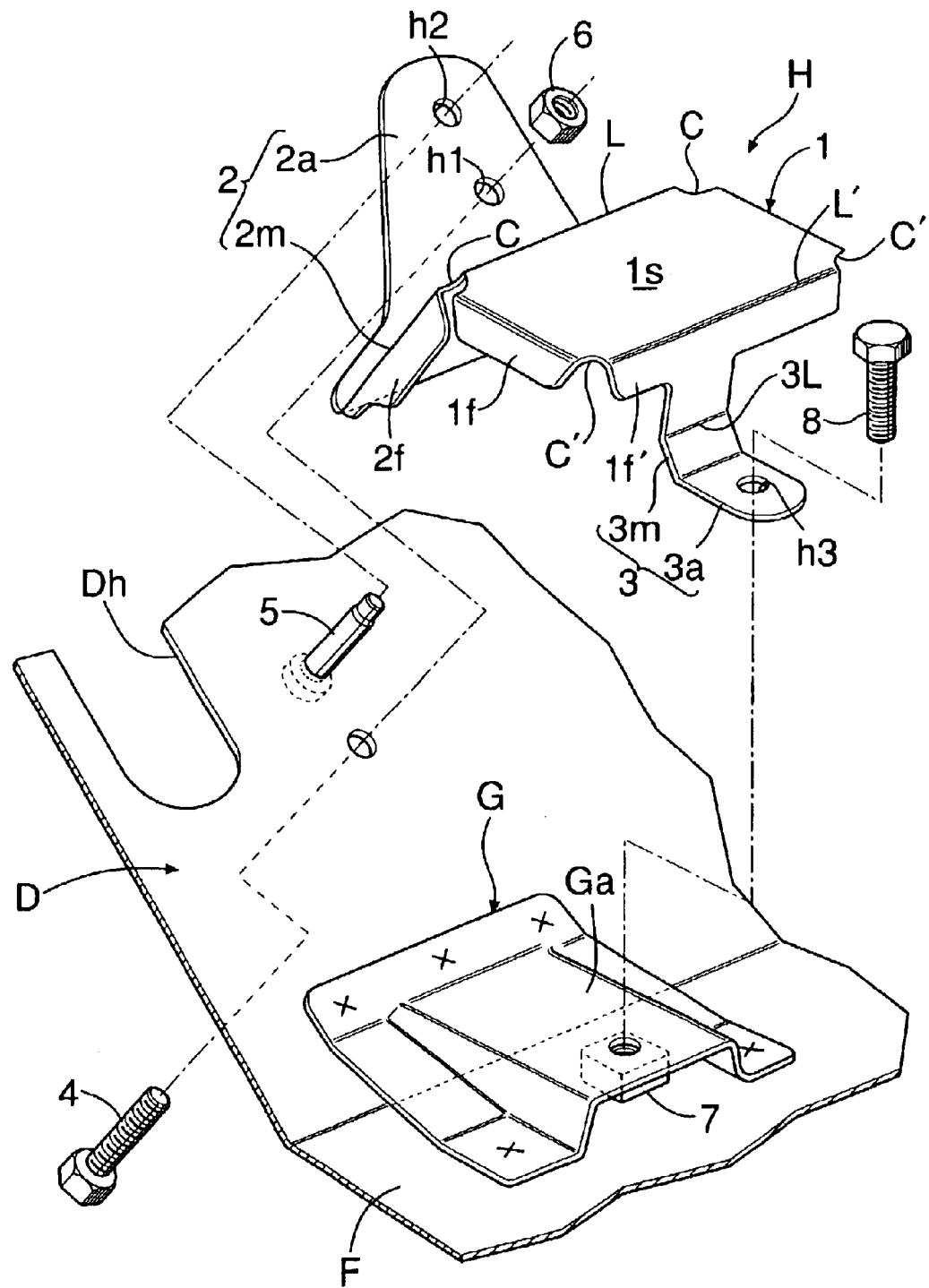
FIG. 3 is an exploded perspective view of an essential part of the embodiment of the present invention.

Referring also to FIGS. 2 and 3, the structure of the heel stopper member H is explained. The heel stopper member H is formed from a receiving plate 1, a front support plate 2, and a rear support plate 3, and is generally hat-shaped when viewed from the side. The receiving plate 1 has on the outside a flat heel receiving surface 1s that is inclined downward and rearward, and on the inside faces the dash panel D with a space S therebetween. The front support plate 2 is connected integrally to a front end part of the receiving plate 1 and has an extremity 2a joined to the dash panel D. The rear support plate 3 is connected integrally to a rear end part of the receiving plate 1 and has an extremity 3a joined to the floor panel F.

In this heel stopper member H, the rear support plate 3 is made weaker than the receiving plate 1 and the front support plate 2 so that the rear support plate 3 will buckle when the pushing-in load acting on the receiving plate 1 is equal to or greater than a predetermined value, and the flexural rigidity values of the front support plate 2 and the receiving plate 1 are set so that the front support plate 2 falls forward so as to make the receiving plate 1 sink forward when the pushing-in load acting on the receiving plate 1 is equal to or greater than a predetermined value. As a result, when a compression load that is equal to or greater than a predetermined value is applied between the heel K and the receiving plate 1 due to a collision of the automobile, the shock acting on the heel K is primarily absorbed by the buckling of the rear support plate 3 and, furthermore, is secondarily absorbed by the failing forward of the front support plate 2. One embodiment of the structure of the heel stopper member H that is effective in exhibiting such an shock-absorbing function is now explained in detail.

The front support plate 2 is formed from a support plate main body 2m, and a seating plate portion 2a as the extremity which is connected integrally to the lower end of the support plate main body 2m in a forward flange shape and superimposed on the dash panel D. The support plate main body 2m is formed into a laterally longer rectangular shape having substantially the same width as that of the receiving plate 1 which has a laterally longer generally rectangular shape. The support plate main body 2m is connected integrally to the receiving plate 1 via a front ridgeline L extending in the lateral direction of the vehicle body and forms a predetermined angle α with the receiving plate 1. In the illustrated embodiment, the seating plate portion 2a is displaced to one side laterally so as to bypass an assembly hole Dh formed in the dash panel D near the accelerator pedal A. Inserting a bolt 4 and a detent pin 5 implanted in the dash panel D through two engagement holes h1, h2 formed in the seating plate portion 2a with a gap therebetween and tightening a nut 6 on the bolt 4, enables the front support plate 2 to be joined to the dash panel D and fixed at two positions so that they cannot swing relative to each other.

The rear support plate 3 is formed from a support plate main body 3m, and a seating plate portion 3a as the extremity which is connected integrally to the lower end of the support plate main body 3m in a rearward flange shape and superimposed on the top of the expanded portion Ga of the gusset G. The support plate main body 3m has a longitudinal rectangular shape having a considerably smaller width than that of the receiving plate 1. The support plate main body 3m is connected integrally to the receiving plate 1 via a rear ridgeline L' extending in the lateral direction of the vehicle body, and forms a predetermined angle β with the receiving plate 1.

A fold line 3L extending in the lateral direction is formed in a middle section in the longitudinal direction (vertical direction) of the support plate main body 3m of the rear support plate 3 so as to easily cause the buckling of the rear support plate 3. An upper portion and a lower portion on opposite sides of the fold line 3L are connected at a predetermined angle γ, which is close to 180°. Moreover, an engagement hole h3 is formed in the seating plate portion 3a. Tightening a bolt 8 running through the engagement hole h3 into a nut 7 secured to the reverse surface of the expanded portion Ga of the gusset G can fixedly join the rear support plate 3 to the gusset G (and, thus to the floor panel F).

Downward flanges 2f, 1f, 1f' are formed integrally on at least one of left and right edges (both the edges in the illustrated embodiment) of each of the front support plate main body 2m of the front support plate 2 and the receiving plate 1, and the rear edge of the receiving plate 1. In particular, the downward flange 1f' at the rear edge of the receiving plate 1 is connected integrally to an upper end part of the support plate main body 3m of the rear support plate 3. Specially providing these downward flanges 2f, 1f, 1f', together with the effect of the front support plate 2 (support plate main body 2m) and the receiving plate 1 being made broad, can impart to the front support plate 2 (support plate main body 2m) and the receiving plate 1 sufficiently higher rigidity than that of the rear support plate 3.

Furthermore, a front notch C and a rear notch C' are formed in the heel stopper member H. The front notch C separates the downward flange 2f of the front support plate 2 from the downward flange 1f at the lateral edge of the receiving plate 1, and cuts into at least one end (both ends in the illustrated embodiment) of the ridgeline L. The rear notch C' separates the downward flange 1f at the lateral edge of the receiving plate 1 from the downward flange 1f' at the rear edge, and cuts into at least one end (both ends in the illustrated embodiment) of the ridgeline L'. Specially providing these notches C, C' makes it possible to cause folding deformation on the front and rear ridgelines L, L' between the receiving plate 1 and the front and rear support plates 2, 3 (that is, the falling forward deformation of the front support plate 2, which will be described later) without difficulty.

The operation of the embodiment is now explained. Even when the upper part of the dash panel D is slightly deformed rearward due to a large shock from the front to the vehicle body when the automobile is involved in a head-on collision, and the foot of the occupant in the front seat is pushed forward strongly due to inertia, since the heel K can engage with the heel receiving surface 1s of the heel stopper member H, excessive forward movement of the heel K can be suppressed. The shock that the heel K receives when the engagement occurs can be primarily absorbed by buckling (γ>γ') of the rear support plate 3 of the heel stopper member H along the fold line 3L in the middle section as schematically shown in FIG. 4, and furthermore secondarily absorbed by the front support plate 2 falling forward and deforming (α>α', β<β') so as to make the receiving plate 1 (the heel receiving surface 1s) of the member H sink forward.

In this case, since the extremity (the seating plate portion 3a) of the rear support plate 3 of the heel stopper member H is joined to the dash panel D and the floor panel F via the gusset G and the extremity (the seating plate portion 2a) of the front support plate 2 thereof is joined to the dash panel D, the heel stopper member H will not be significantly displaced relative to the dash panel D and the floor panel F. Moreover, the angle through which the receiving plate 1 tilts is maintained in a predetermined appropriate angular range by the buckling of the rear support plate 3 and the falling forward of the front support plate 2, so that the ankle is not forcibly twisted. In this way, the heel K can be appropriately engaged with and supported on the heel receiving surface 1s of the receiving plate 1, thus effectively suppressing the excessive forward movement of the heel K, and moreover, when the heel K is engaged, the heel stopper member H itself deforms (the buckling of the rear support plate 3 and the falling forward of the front support plate 2), thereby effectively absorbing and alleviating the shock acting on the heel K. As described above, since the shock and the moment around the axis in the vehicle width direction acting on the ankle can be lessened while avoiding forcible twisting of the ankle, the burden on the ankle during the collision can be greatly lightened, resulting in a very effective prevention of damage to the ankle.

Furthermore, in the illustrated embodiment, the gusset G is secured to the dash panel D and the floor panel F so as to correspond to the rear end part of the subframe SF, and the extremity (the seating plate portion 3a) of the rear support plate 3 is fixed to the protruding part Ga of the gusset G, the protruding part Ga being separate from the upper surface of the floor panel F. That is, since the rear support plate 3 of the heel stopper member H is supported on the vehicle body via the gusset G in a state in which the rear support plate 3 is raised from the upper surface of the front end part of the floor panel F, even when the subframe SF moves forcefully rearward due to the shock of a collision of the automobile and breaks into the front end part of the floor panel F, it is possible to avoid as much as possible a direct shock on the heel stopper member H by the rear end part of the subframe SF, thereby enabling the heel stopper member H to effectively exhibit the desired shock-absorbing and heel supporting functions.

Moreover, in the illustrated embodiment, since the extremity (the seating plate portion 2a) of the front support plate 2 is secured to the dash panel D at two positions corresponding to the bolt 4 and the detent pin 5, even when the positions where the front and rear support plates 2, 3 are mounted are offset relative to each other in the lateral direction as in the illustrated embodiment, or the directions in which forces are applied to the two support plates 2, 3 are not uniform, the rigid front support plate 2 and the rigid receiving plate 1 of the heel stopper member H can be effectively prevented from swinging around the longitudinal axis and tilting laterally, thereby preventing the ankle from being twisted due to the tilting of the receiving plate 1.

Although an embodiment of the present invention is explained in detail above, the present invention can be modified in a variety of ways without departing from the spirit and scope of the present invention.

For example, in the above-mentioned embodiment, the position of the heel stopper member H is set so as to correspond to the position where the right heel K is placed when pressing the accelerator pedal A, but in the present invention it may be set so as to correspond to a position where the right heel is placed when pressing a brake pedal, or may be set so as to correspond to a position where a left heel is placed (that is, a position where a footrest is to be placed).

Furthermore, in the above-mentioned embodiment, only one fold line 3L is formed in the middle section of the rear support plate 3 in order to easily cause the buckling of the rear support plate 3, but in the present invention a plurality of parallel fold lines may be provided in the middle section of the rear support plate 3. In order to easily cause the buckling, it is also possible to form a hole or a thinner part in the middle section of the rear support plate 3 instead of or in addition to such a fold line.

Moreover, in the above-mentioned embodiment, the extremity (the seating plate portion 3a) of the rear support plate 3 is joined to the dash panel D and the floor panel F via the gusset G fixed to both D and F so as to bridge them, but it is also possible to join the extremity (the seating plate portion 3a) of the rear support plate 3 to only one of the dash panel D and the floor panel F via a gusset.

Furthermore, when no vehicle body component (subframe SF) that might directly hit the heel stopper member H is provided on the front side thereof, the extremity (the seating plate portion 3a) of the rear support plate 3 may be joined directly to one of the dash panel D and the floor panel F without any gusset.

What is claimed is:

1. An automobile heel stopper shock-absorbing structure in which a heel stopper member is disposed in a lower part of a dash panel of a vehicle body so as to project rearward from the panel surface and be capable of engaging with a heel of an occupant in a front seat, wherein the heel stopper member is formed from a receiving plate that on the outside has a heel receiving surface and on the inside faces the dash panel with a space therebetween, a front support plate connected integrally to a front end part of the receiving plate and having its extremity joined to the dash panel, and a rear support plate connected integrally to a rear end part of the receiving plate and having its extremity joined to at least one of the dash panel and a floor panel, and wherein the rear support plate is made weaker than the receiving plate and the front support plate so that the rear support plate will buckle when a pushing-in load acting on the receiving plate is equal to or greater than a predetermined value, and values of flexural rigidity of the front support plate and the receiving plate are set so that the front support plate falls forward so as to make the receiving plate sink forward when the pushing-in load acting on the receiving plate is equal to or greater than a predetermined value, whereby when a compression load acting between the heel and the receiving plate becomes equal to or greater than a predetermined value due to a collision of an automobile, a shock acting on the heel is primarily absorbed by buckling of the rear support plate, and furthermore is secondarily absorbed by falling-forward of the front support plate.

2. The automobile heel stopper shock-absorbing structure according to claim 1, wherein the extremity of the front support plate is secured to the dash panel at two or more positions.

3. The automobile heel stopper shock-absorbing structure according to either claim 1 or 2, wherein a gusset is secured to at least one of the dash panel and the floor panel so as to correspond to a rear end part of a subframe that supports an engine on the vehicle body on the front side of the dash panel, and the extremity of the rear support plate is fixed to a protruding part of the gusset, the protruding part being separate from an upper surface of the floor panel.

4. The automobile heel stopper shock-absorbing structure according to either claim 1 or 2, wherein the front support plate is connected to the receiving plate at a predetermined angle so as to form therebetween a ridgeline extending in the lateral direction of the vehicle body, downward flanges are formed integrally on at least one of left and right edges of each of the front support plate and the receiving plate, and a notch is formed in the heel stopper member so as to separate the downward flange of the front support plate from the downward flange of the receiving plate and cut into at least one end of the ridgeline.

5. The automobile heel stopper shock-absorbing structure according to either claim 1 or 2, wherein at least one fold line is formed in a middle section of the rear support plate so as to easily cause the buckling of the rear support plate.

* * * * *